Patented Nov. 28, 1950

2,531,431

UNITED STATES PATENT OFFICE 2,531,431

METHOD OF PREPARING CALCIUM FIRMED FROZEN APPLE SLICES

Claude H. Hills, Philadelphia, Pa., assignor to United States of America as represented by the Secretary of Agriculture No Drawing. Application January 30, 1948,
Serial No. 5,480

10 Claims. (Cl. 99—100)

(Granted under the act of March 3, 1883, as
amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to treatment of fruit material and more particularly to a method of improving the consistency of frozen apple slices.

At the present time a considerable portion of the annual apple crop cannot be utilized for commercial processing, such as canning or freezing, and is wasted or diverted to less economical uses because the fruit is too soft to withstand treatment by conventional methods. The lack of firmness of the apple tissue which causes it to disintegrate on processing and handling, or to acquire an unattractive mushy appearance on subsequent cooking, may be due to overripe condition or may constitute an inherent characteristic of a given variety.

An object of this invention, accordingly, is to provide a method for improving the consistency of processed apple tissues. Another object is to provide means for inhibiting disintegration of frozen apple slices on subsequent thawing and cooking. A further object is the provision of improved fruit products. Other objects and advantages will be apparent from the description of the invention.

One of the methods used commercially for preventing discoloration of frozen apple slices during storage and on thawing is to steam-blanch the slices prior to freezing. Usually the blanched slices are then cooled by dipping in, or spraying with, cold water.

I have found that the texture and consistency of apple slices are improved if the blanched slices are cooled by contacting them with an aqueous solution containing a calcium salt. I have found further that when the apple tissues are very soft due to an overripe condition, a more pronounced firming effect is attained if the blanched slices are cooled by contacting them with an aqueous solution containing a calcium salt and an alkaline buffer.

It is known that the consistency of plant tissues can be altered by the action of soluble calcium salts. Thus, it has been proposed to prevent disintegration of apple spices by dipping them in a solution of calcium chloride prior to baking, canning, or freezing. Apple slices to be frozen have also been firmed by blanching them in a dilute calcium chloride solution, or by adding calcium chloride to the sirup used to cover the frozen slices. These procedures, however, do not yield entirely satisfactory results since they cause only the surface of the slices to be firmed without affecting the consistency of the underlying tissues, and produce apple slices, the interior of which remains soft and mushy. Such externally firmed apple slices do not handle properly in the subsequent freezing, thawing, and cooking processes. In contradistinction hereto, the process of the present invention produces a more evenly distributed effect upon the whole body of fruit tissue and yields firmed apple slices which display the same improved consistency throughout the entire slice.

According to this invention, the blanched apple slices are cooled, preferably by dipping in, or spraying with, an aqueous solution of a calcium salt, the temperature of said solution being sufficiently below that of the blanched slices to produce a cooling effect on contact therewith. If a more pronounced firming effect is desired, for example, when the apple tissue treated is very soft due to overripe condition, an alkaline buffer, such as sodium acetate, di-sodium phosphate, or sodium carbonate is added to the aqueous calcium salt solution used to cool the blanched apple slices.

The process may be conducted using a solution of any non-toxic, water-soluble calcium salt such as calcium chloride, calcium acetate, calcium gluconate, and the like, which may be utilized at concentrations of about from 0.2 percent to 2.0 percent, the concentration of calcium salt required to attain the best results varying with the variety and maturity of the apples.

Cooling of the blanched apple slices is usually effected by means of a calcium salt solution maintained at about room temperature. The length of time during which the apple slices are in contact with the calcium salt solution is not critical provided the duration of the treatment is sufficient to lower the temperature of the blanched slices.

The cooling of blanched apple slices with an aqueous solution of a calcium salt in the presence or in the absence of an alkaline buffer is a highly effective and economical method of firming apple slices and is readily adaptable for use in combination with conventional steps of processing fresh apples for refrigeration.

The following examples are illustrative of the invention. The "firmness rating," shown in the tables therein, has the following significance on a scale of 0 to 5: 0 equals sauce consistency, 3 equals optimum firmness, and 5 equals tough.

EXAMPLE I

Firm, ripe Rambo apples were peeled, cored, and sliced into twelfths. The slices were then blanched with steam at atmospheric pressure for 90 seconds, and cooled by dipping in a solution of calcium chloride. The slices were then drained, packaged, and placed in a freezing cabinet at $-20°$ C. The next day the frozen slices were thawed and cooked in boiling water for 20 minutes. On cooling the cooked slices were examined for firmness.

A control batch of apple slices was treated exactly in the same manner except that the blanched slices were cooled by dipping in distilled water.

The results obtained are shown in the following table:

*Table I*

| Expt. No. | Cooling Solution | Duration of Cooling in Solution | Consistency of Cooked Apple Slices | Firmness Rating |
|---|---|---|---|---|
| | | Mins. | | |
| 1 | Distilled water (control) | 20 | Very Soft | 1 |
| 2 | 1% $CaCl_2.2H_2O$ in water | 30 | Optimum firmness | 3 |
| 3 | ...do... | 10 | ...do... | 3 |
| 4 | ...do... | 5 | ...do... | 3 |
| 5 | ...do... | 2 | ...do... | 3 |

It will be observed that the time of contact with the calcium chloride solution is not critical since periods ranging from 2 to 30 minutes gave satisfactory results.

EXAMPLE II

Ripe McIntosh apples were peeled, cored, and sliced into twelfths. The slices were blanched with steam at atmospheric pressure for 90 seconds and cooled to room temperature by spraying with a solution of calcium chloride in water. The slices were then drained, packaged, and frozen at $-20°$ C. The next day the slices were thawed and cooked in boiling water for 20 minutes. The cooked slices were cooled and examined for firmness. A control batch of apple slices was treated exactly in the same manner except that the blanched slices were cooled by spraying with distilled water.

The results obtained are shown in the following table.

*Table II*

| Expt. No. | Cooling Solution | Consistency of Cooked Apple Slices | Firmness Rating |
|---|---|---|---|
| 6 | Distilled water (control) | Sauce consistency | 0 |
| 7 | 0.1% aq. sol. of $CaCl_2.2H_2O$ | Very soft | 1 |
| 8 | 0.20% aq. sol. of $CaCl_2.2H_2O$ | Soft | 1½ |
| 9 | 0.50% aq. sol. of $CaCl_2.2H_2O$ | Nearly optimum firmness | 2½ |
| 10 | 1.0% aq. sol. of $CaCl_2.2H_2O$ | ...do... | 2½ |

EXAMPLE III

Firm, ripe McIntosh apple slices were blanched with steam at atmospheric pressure for 90 seconds and cooled by dipping for 5 minutes in solutions containing from 0.2 to 2 percent calcium chloride. The slices were then drained, packaged, and frozen. The following day the frozen slices were thawed, cooked as described in the foregoing examples, and examined for firmness.

A control batch of apple slices was treated exactly in the same manner except that the blanched slices were cooled by dipping for 5 minutes in distilled water.

The results obtained are shown in the following table.

*Table III*

| Expt. No. | Cooling Solution | Consistency of Cooked Apple Slices | Firmness Rating |
|---|---|---|---|
| 11 | Distilled water (control) | Very soft | 1 |
| 12 | 0.2% aq. sol. of $CaCl_2.2H_2O$ | Optimum firmness | 3 |
| 13 | 0.5% aq. sol. of $CaCl_2.2H_2O$ | ...do... | 3 |
| 14 | 1.0% aq. sol. of $CaCl_2.2H_2O$ | ...do... | 3 |
| 15 | 2.0% aq. sol. of $CaCl_2.2H_2O$ | Too firm | 4 |

EXAMPLE IV

A 5-pound batch of apple slices was blanched as described in the foregoing examples and cooled by dipping for 5 minutes in 1 percent calcium chloride solution. The slices were then frozen at $-20°$ C. The next day the frozen slices were thawed and baked into pies. A control batch of apple slices was treated exactly in the same manner except that the blanched slices were cooled by dipping for 5 minutes in distilled water.

The firmed slices held up very well on baking whereas the control batch disintegrated to an applesauce consistency on cooking.

EXAMPLE V

Firm, ripe McIntosh apple slices were blanched with steam at atmospheric pressure for 90 seconds and cooled by dipping for 5 minutes in a solution containing 0.5 percent calcium chloride and 1.5 percent sodium acetate as an alkaline buffer. The slices were then drained, packaged, and frozen. The following day the frozen slices were thawed, cooked as described in the foregoing examples and examined for firmness.

Two control batches of apple slices were treated in the same manner except that one batch of blanched slices was dipped for 5 minutes in 0.5 percent calcium chloride solution and the second batch was dipped for 5 minutes in distilled water. The results are shown in the following table:

Table IV

| Expt. No. | Cooling Solution | Consistency of Cooked Apple Slices | Firmness Rating |
|---|---|---|---|
| 16 | Distilled water (control) | Very soft | 1 |
| 17 | 0.5% aq. sol. of CaCl₂.2H₂O | Nearly optimum firmness | 2+ |
| 18 | 0.5% aq. sol. of CaCl₂.2H₂O plus 1.5% sodium acetate. | Optimum firmness | 3 |

Although in the foregoing examples the process of my invention is described using calcium chloride as the calcium salt and sodium acetate as the alkaline buffer, similar results are obtained by analogous procedures using aqueous solutions containing equimolecular concentrations of other calcium salts such as calcium acetate and calcium gluconate, and alkaline buffers such as di-sodium phosphate and sodium carbonate.

When the apple tissue is so soft that the slices disintegrate on handling after blanching, the apple slices can be dipped in calcium chloride solution prior to blanching. The slices so treated are firmed on the surface and thus excessive mushing and disintegration during blanching is prevented. If the blanched slices are then cooled by dipping in or spraying with a solution of a calcium salt (with or without added alkaline buffer) the interior of the slices is firmed to give a slice of uniform consistency.

Having thus described my invention, I claim:
1. A process of improving the consistency of apple tissues comprising reducing fresh apples to suitable pieces, blanching the pieces by exposing them to the action of live steam, and cooling the blanched apple pieces by contacting them with an aqueous solution containing a calcium salt in a concentration of about from .2 to 2.0%.
2. The process of claim 1 wherein the calcium salt is calcium chloride.
3. The process of claim 1 wherein the calcium salt is calcium acetate.
4. The process of claim 1 wherein the calcium salt is calcium gluconate.
5. A process of improving the consistency of apple tissues comprising reducing fresh apples to suitable pieces, blanching the pieces by exposing them to the action of live steam, and cooling the blanched apple pieces by contacting them with an aqueous solution containing a calcium salt in a concentration of about from .2 to 2.0% and an alkaline buffer.
6. The process of claim 5 wherein the alkaline buffer is sodium acetate.
7. The process of claim 5 wherein the buffer is di-sodium phosphate.
8. The process of claim 5 wherein the buffer is sodium carbonate.
9. The process of claim 5 wherein the calcium salt is calcium chloride and the alkaline buffer is sodium acetate.
10. A process of improving the consistency of apple tissues comprising reducing fresh apples to suitable pieces, blanching the pieces by exposing them to the action of live steam, and cooling the blanched apple pieces to about room temperature by contacting them with an aqueous solution containing a calcium salt in a concentration of about from .2 to 2.0%.

CLAUDE H. HILLS.

REFERENCES CITED

The following references are of record in the file of this patent:

Kertesz—The Canner—vol. 86 No. 7 p. 26 (1938).